US006481211B1

(12) United States Patent
Haas

(10) Patent No.: US 6,481,211 B1
(45) Date of Patent: Nov. 19, 2002

(54) TURBINE ENGINE CYCLING THERMO-MECHANICAL STRESS CONTROL

(76) Inventor: Joel C. Haas, 114 Olympus Cir., Jupiter, FL (US) 33477

( * ) Notice: Subject to any disclaimer, the term of this patent is extended or adjusted under 35 U.S.C. 154(b) by 47 days.

(21) Appl. No.: 09/707,420

(22) Filed: Nov. 6, 2000

(51) Int. Cl.[7] .................................................. F02C 7/12
(52) U.S. Cl. ............................................ 60/782; 60/806
(58) Field of Search .......................... 60/782, 795, 806; 415/115, 116, 117

(56) References Cited

U.S. PATENT DOCUMENTS

| | | | | |
|---|---|---|---|---|
| 3,949,549 A | | 4/1976 | Holl | |
| 4,117,669 A | * | 10/1978 | Heller | 415/115 |
| 4,190,398 A | | 2/1980 | Corsmeier et al. | |
| 4,767,259 A | * | 8/1988 | Kurosawa et al. | 415/115 |
| 4,815,928 A | | 3/1989 | Pineo et al. | |
| 4,967,552 A | * | 11/1990 | Kumata et al. | 60/806 |
| 6,152,685 A | * | 11/2000 | Hagi | 415/116 |

* cited by examiner

*Primary Examiner*—Louis J. Casaregola
(74) *Attorney, Agent, or Firm*—McHale & Slavin

(57) ABSTRACT

A method and apparatus for controlling thermal stress in a turbine engine includes the steps and structure for heating or cooling the thermally cycled engine parts for a certain amount of time at a certain rate before or while the operating point of the engine is changed.

4 Claims, 1 Drawing Sheet

TURBINE ENGINE CYCLING THERMO-MECHANICAL STRESS CONTROL

FIELD OF THE INVENTION

This invention relates to the field of turbine engines and, more specifically, to a method and apparatus for prolonging the life of turbine blades by reducing thermo-mechanical stresses in thermally cycled engine parts.

BACKGROUND OF THE INVENTION

Turbine engines are commonly used in the generation of electrical power. The useful work obtained from a turbine engine is in the form of rotational shaft power. This shaft power can be fed directly into an electric power generator to produce electricity. Typically, a power company will run large turbine engine powered generators to satisfy the base load demand then either operate smaller output generators or purchase power from other sources during periods of peak demands. This strategy worked well when the energy producing community had high excess capacity. Ever increasing energy demands have shrunk excess capacity, making the peak power requirements larger than ever. The demand can get high enough to require the operation of additional large turbine powered generators. Of the large turbine powered generators, the only type of turbine that can provide power in a timely fashion are gas turbines. The result is that large gas turbine powered generators are being cycled frequently to full power, in an effort to satisfy peak demand. These large gas turbines are not designed to be operated in this fashion. They were designed to be turned on and left on for long periods of time to satisfy the base load demand. Not operating the engine in this fashion constitutes a change in the duty cycle of the engine.

The expected lifetime of the components in a gas turbine engine are is predicted analytically during the design phase. This process is referred to as lifting analysis. A key element of the lifting analysis is the duty cycle. Deviation from the designed duty cycle can have a drastic effect on the life of gas turbine components. As expected, the gas turbines used for peak demand power generation have a high rate of component failure. This is very costly in both parts and machine down time. To create a solution to the problem that does not involve a new engine designed specifically for the task, the nature of the problem must be understood.

As stated earlier, the nature of the current energy market has resulted in the operation of gas turbines outside their designed duty cycle. The present duty cycle now includes a much higher frequency of power level changes. These power level changes are the root of the problem. For example, when an engine is operating at idle, the rotational speed and gas temperatures inside the engine are low. As the engine transitions to full power, both rotational speed and the gas temperature increase dramatically. Increasing rotational speed increases the mechanical stress in the part. When a relatively cool part is immersed in a much higher temperature fluid, an additional stress is caused, called thermal stress. These two types of stresses together can produce an overall stress level high enough to permanently weaken a part. Repeating this condition eventually causes the part to fail. The present invention reduces thermal stresses by thermally conditioning the components before the temperature change occurs. For example, if a temperature increase is to occur, a part might be preheated in a controlled fashion. This would result in a lowering of the thermal stresses, thus extending the life of the part.

DESCRIPTION OF THE PRIOR ART

The prior art is replete with teachings of cooling gas turbine parts by bleeding off compressor air and routing it to the parts to be cooled via a secondary airflow system. In these systems, the compressor establishes the pressure, temperature and flow rate of the coolant. The compressor does not operate at conditions that provide optimal pressure, temperature and flow rate at all times.

Representative of such systems are: U.S. Pat. No. 4,190,398 which discloses a system to cool turbine blades using compressor air flowing through a heat exchanger operating as a thermosiphon to cool engine parts.

U.S. Pat. No. 4,815,928 which discloses a two position, off-on, valve and controller to regulate the air flow rate from the compressor to the engine parts.

U.S. Pat. No. 3,949,549 which discloses a heat exchanger in the coolant line and a valve to control flow rate of the coolant.

None of these prior art devices teach the modulation of the coolant fluid temperature and pressure and flow or any combination thereof to prolong engine life.

SUMMARY OF THE INVENTION

Disclosed is a method and apparatus for controlling thermal stress in a turbine engine which includes the steps and structure for heating or cooling the thermally cycled engine parts for a certain amount of time at a certain rate before the operating point of the engine is changed.

Accordingly, it is an objective of the instant invention to teach a method of altering the duty cycle of any gas turbine in such a way so as to decrease thermal stresses thus increasing the usable lifetime of thermally cycled parts.

It is a further objective of the instant invention to teach the modulation of temperature and pressure and flow of the coolant fluid to the thermally cycled parts of the engine.

It is yet another objective of the instant invention to teach the use of an engine controller which will compare status and projected change and initiate heating or cooling of the coolant air flow and determine time and coolant flow rate required to adjust the engine to a desired operating point. The controller may perform the functions automatically or inform an operator for manual execution.

It is a still further objective of the invention to teach the use of electric resistance heating or thermoelectric devices in the engine to heat or cool the thermally cycled parts. These electrical elements may be used independently or in conjunction with the coolant fluid.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE INVENTION

The term, “coolant,” as used herein, is a relative term denoting the flow of fluid used to modify the temperature of the thermally cycled parts of the engine, such as the combustor and turbine blades with associated hardware. The "coolant" may actually have a higher temperature than the engine parts, in some cases. Also, depending on ambient conditions and/or operating conditions, the heater and cooler of the system may not be used to modulate the coolant.

Figure 1:
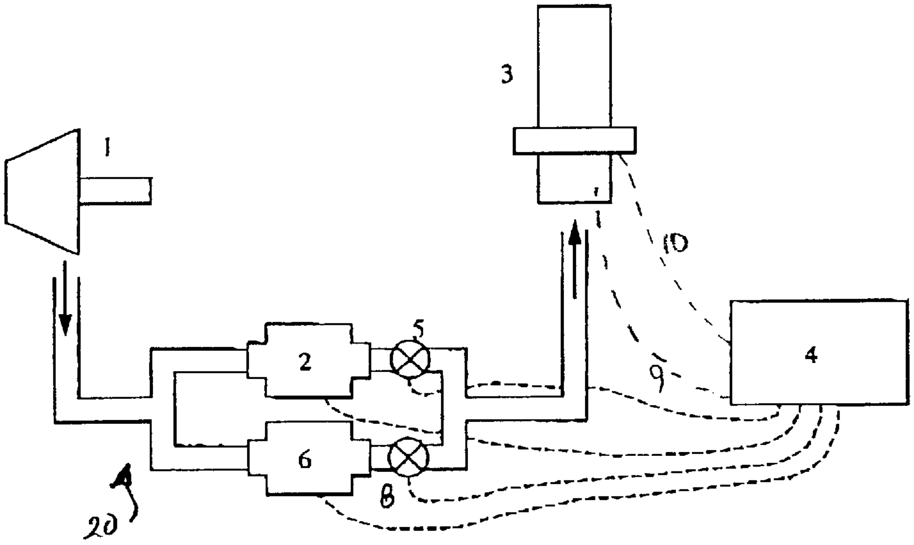
FIG. 1 is a schematic of the coolant flow within a turbine of this invention.

In FIG. 1, the compressor 1 generates coolant fluid flow through a secondary system 20. The coolant fluid flow does not necessarily originate with the compressor stage of the engine in which the duty cycle is being modified. The compressor conditions the coolant fluid as to rate of flow, pressure, and temperature. The coolant flow is split in the system parallel paths with equal portions directed to the cooler 2 and the heater 6. The cooler 2 may be constructed as a heat sink or may have electrical or mechanical components to extract heat from the incoming fluid flow. Heater 6 is constructed with components to add thermal energy to the coolant fluid flow, either electrically or mechanically.

The cooler and the heater each have a flow control valve 5 and 8, respectively, to vary the flow rate downstream. The divided flow is reunited and directed to turbine blades 3, as shown in FIG. 1. In certain operating phases the flow control valve for either the cooler or the heater may be closed resulting in total coolant fluid flow through either the cooler or heater. In other operating phases, the flow from the cooler and heater may be mixed. In still other operating phases, the coolant may circulate through the heater and cooler without the heater or cooler being activated. The temperature of the flow is modified as required to lessen the thermal stress of the turbine blades as the engine is powered up or throttled down. In this manner, the conditioned coolant fluid is modified and the temperature gradients are lessened resulting in the engine being maintained within the duty cycle parameters for an increased amount of time.

The cooler 2, heater 6 and valves 5 and 8, of FIG. 1, are controlled manually or automatically by controller 4 through harness 9. In operation, the controller 4 monitors current engine operating condition and coolant temperature. The temperature inputs to the controller are collected from conventional heat sensors placed in or on the thermally cycled parts, in the coolant flow, in the cooler and in the heater and relayed by harness 9. The sensors which are not giving a direct reading of temperature have a calibration function which relates the temperature at the locus of the sensor to the temperature of the thermally cycled part.

In addition to the coolant fluid heater and cooler, there may be electro-resistor heating elements and thermoelectrical cooling elements installed directly in the thermally cycled engine parts with the elements monitored and controlled by controller 4 through connection 10.

Commands for different operating levels are entered in the controller, either by an operator or by signal. The controller will then adjust either the coolant temperature, or the coolant pressure, or the coolant flow, or any combination, to minimize thermal stress on the engine. The modulation of the coolant will be based on which operating conditions the engine is transitioning between and what parts are affected. The controller will either raise or lower the temperature of the coolant and determine the length of time the engine must operate at the new coolant settings before the engine controls can be changed to the new operating level. Once sufficient time has passed, the controller would indicate to the operator that it is safe to move the engine controls to the commanded operating level. In the automatic mode, the controller could operate the engine directly, making the whole process invisible to the operator.

In operation, the current temperatures are compared to the projected temperatures of the commanded operation level. The temperature or flow or pressure, or combination thereof, of coolant fluid would be adjusted to optimize the temperature gradient between the current temperature and the target temperature. For example, in throttling up to full power from standby, the controller has inputs of the current temperatures existing in the engine and the projected temperature of full throttle power. The optimum gradient or slope of the temperature increase over time to prevent thermal shock is computed. In this example, most likely the coolant fluid would initially be heated. The required heating may be accomplished by heating the coolant fluid or by the electric heating of the engine parts or a combination of both modes. The resulting temperature rate of increase continues until an internal temperature is reached, below final operating temperature, when full throttle is commanded by the controller. At this point, the engine's full power continues to increase the temperature up to final operating temperature but without producing thermal shock. After full throttle is commanded and operating temperature continues to rise, the controller monitors the temperatures and begins to modulate the coolant fluid flow to stabilize internal temperatures at the desired final operating temperature. The coolant fluid flow may be proportional through the cooler and the heater tending toward less heating and more cooling.

When the engine is commanded to standby, the whole process is repeated in reverse. In this example, the engine coolant fluid flow would probably be entirely through the cooler, at full power. Thermal shock would be induced by too rapid cooling of the thermally cycled parts of the engine unless the temperature gradient is modulated. Here, the controller compares the full power operating temperature with the lower standby temperature and computes the temperature gradient over time to prevent thermal shock. The coolant fluid flow would continue through the cooler until the internal temperatures begin to drop. To modulate the gradient, the controller directs the heater and heater control valve so that some coolant fluid flow goes through the heater. Here, again, the heater could have electric elements or the engine parts could have electrical heating. Over the requisite period of time the engine parts are gradually cooled toward standby temperatures. At a given point, above standby temperatures the controller commands the engine to standby status and the remainder of the captured heat in the engine dissipates as the engine spools down.

Figure 2:
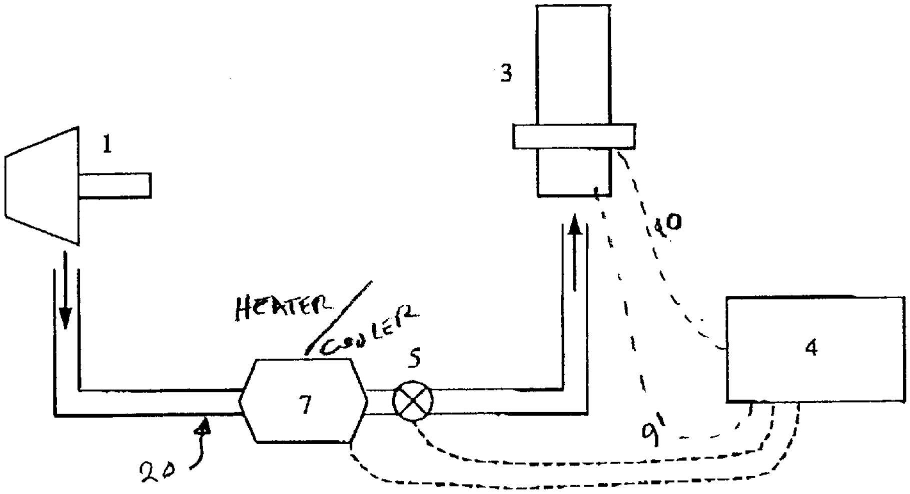
FIG. 2 is a schematic of another embodiment of the coolant flow within a turbine of this invention.

FIG. 2 illustrates another simplified embodiment of the system in which the heating and cooling components are integrated, in the nature of a heat pump, within housing 7. The heating and cooling functions are subject to the controller 4, as in FIG. 1. The total coolant fluid flow enters the housing 7 and flow to the engine is regulated by the control valve 5.

Figure 3:
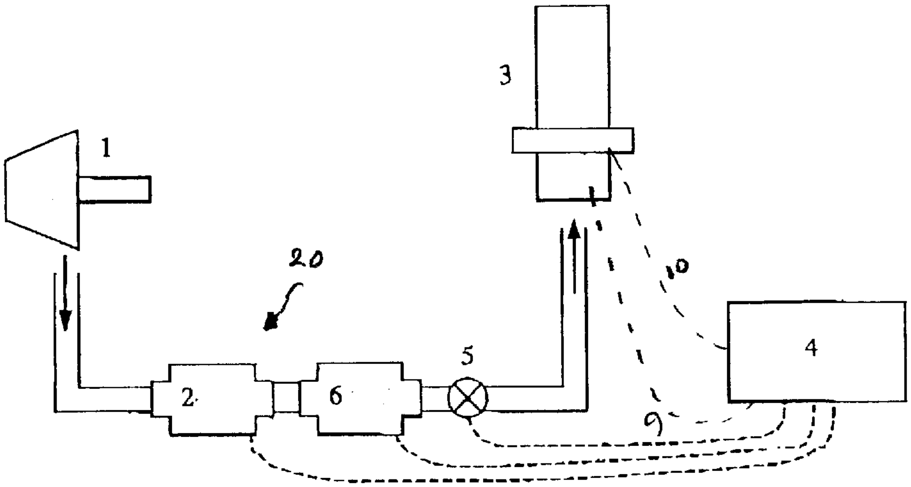
FIG. 3 is a schematic of another embodiment of the coolant flow within a turbine of this invention.

FIG. 3 shows another embodiment in which the heater and cooler are co-located in series in one line and the downstream flow is regulated by one control valve 5. As shown in the drawing, the cooler is illustrated as nearer the compressor 1 but the sequence may be reversed.

In each of the embodiments of FIGS. 2 and 3, there may be electrical heating and cooling in the engine parts, schematically illustrated at 10, which may be applied separately or in conjunction with the coolant fluid flow.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

What is claimed is:

1. A method of reducing thermal stresses in thermally cycled components of a turbine engine, said engine having commanded phases of operation, comprising the steps of a) providing a source of coolant and a conveying system for delivering said coolant to said thermally cycled components, b) providing flow control valves in said conveying system, c) providing temperature sensors for said thermally cycled components, d) providing a controller having the temperature ranges of said thermally cycled components for all operating phases and a pre-determined temperature-time schedule of temperature change to prevent thermal shock to said thermally cycled components, e) providing a cooler and a heater operatively connected to said conveying system to condition said coolant, f) operatively connecting said controller to said temperature sensors, said flow control valves, said cooler and said heater, g) said controller comparing the present temperature of the current phase of operation with a target temperature of a commanded different phase of operation, h) said controller activating said flow control valves, or said cooler, or said heater, in accordance with the current temperature gradient and said temperature-time schedule for the determined amount of time to reach said target temperature.

2. A method of claim 1 comprising the step of i) providing automatic control to change phase of operation of said engine when said target temperature is reached.

3. A method of claim 1 comprising the step of i) providing a signal when said target temperature is reached.

4. A method of claim 1 comprising the steps of activating said flow control valves, said heater or said cooler to moderate said condition of said coolant as said temperature gradient approaches said target temperature.

* * * * *